(12) United States Patent
Bianco et al.

(10) Patent No.: US 6,227,002 B1
(45) Date of Patent: May 8, 2001

(54) TRANSPORTABLE TELESCOPING COOLER

(75) Inventors: Michael Bianco, Palm Beach Gardens; Charles M. O'Malley, Deerfield Beach, both of FL (US)

(73) Assignee: Cool Care, Ltd., Boynton Beach, FL (US)

( * ) Notice: Subject to any disclaimer, the term of this patent is extended or adjusted under 35 U.S.C. 154(b) by 0 days.

(21) Appl. No.: 09/369,332

(22) Filed: Aug. 6, 1999

(51) Int. Cl.$^7$ .................................................... F25D 23/00
(52) U.S. Cl. .................................................. 62/302; 62/239
(58) Field of Search ........................... 62/302, 239, 371; 414/402; 198/588

(56) References Cited

U.S. PATENT DOCUMENTS

| | | | |
|---|---|---|---|
| 2,968,933 | * 1/1961 | Pfeifer et al. | 62/176 |
| 3,066,817 | * 12/1962 | Bradshaw et al. | 214/522 |
| 4,299,421 | * 11/1981 | Bontrager | 296/27 |
| 5,487,462 | * 1/1996 | Gilmore | 198/594 |
| 5,789,007 | 8/1998 | Bianco . | |
| 5,965,185 | 10/1999 | Bianco . | |
| 6,003,658 | * 12/1999 | Best et al. | 198/588 |

* cited by examiner

*Primary Examiner*—William Doerrler
*Assistant Examiner*—Melvin Jones
(74) *Attorney, Agent, or Firm*—Kenyon & Kenyon (57) ABSTRACT

An apparatus and method for cooling produce is disclosed. In an embodiment for the apparatus of the present invention, the apparatus includes a container having an interior volume and a cooler. The cooler is movable between a first position where the cooler is disposed within the interior volume and a second position where the cooler is at least partially retracted from the interior volume. The cooler is adapted to cool at least a portion of the interior volume when the cooler is in its second position. In an embodiment for a method in accordance with the present invention, the method includes the steps of retracting the cooler at least partially from the container, storing produce within the container, and cooling an interior volume of the container with the cooler.

37 Claims, 11 Drawing Sheets

TRANSPORTABLE TELESCOPING COOLER

BACKGROUND OF THE INVENTION

The present invention relates to an apparatus and method for cooling produce.

Currently, it is known to provide a system for cooling produce in the field, however, current systems require multiple trucks; at least one truck to support and transport a cooling unit and a separate truck to store the produce for cooling. The requirement to have multiple trucks presents drawbacks, one of which is increased costs.

One currently known cooling system uses vacuum coolers which may be utilized to cool between 2–20 pallets of produce. However, a vacuum cooler that is able to cool up to 20 pallets requires at least two "low boy" trucks to transport the cooler, with a third truck possibly being required if a generator unit is included. Additionally, up to 20 minutes may be required to pre-cool the produce.

A hydro-cooler requires up to 2–3 flat bed trucks for transport. These types of coolers run cold water over the produce in order to attempt to cool it.

An additionally known cooling system utilizes portable forced air units. In order to use this type of cooling system, up to 3 flat bed trucks may be required. These cooling systems have additional drawbacks which include large temperature spreads from the cooling system, variation in temperature within the produce, and at least a 53 foot trailer being required.

Therefore, it would be desirable to provide an improved apparatus and method for pre-cooling produce in the field.

SUMMARY OF THE INVENTION

In accordance with the present invention, an apparatus and method for cooling produce is provided. In an embodiment for the apparatus of the present invention, the apparatus includes a container having an interior volume and a cooler. The cooler is movable between a first position where the cooler is disposed within the interior volume and a second position where the cooler is at least partially retracted from the interior volume. The cooler is adapted to cool at least a portion of the interior volume when the cooler is in its second position.

In an embodiment for a method in accordance with the present invention, the method includes the steps of retracting the cooler at least partially from the container, storing produce within the container, and cooling an interior volume of the container with the cooler.

BRIEF DESCRIPTION OF THE DRAWINGS

The various features of the invention will best be appreciated by simultaneous reference to the description which follows and the accompanying drawings, in which.

DETAILED DESCRIPTION

Figure 1:
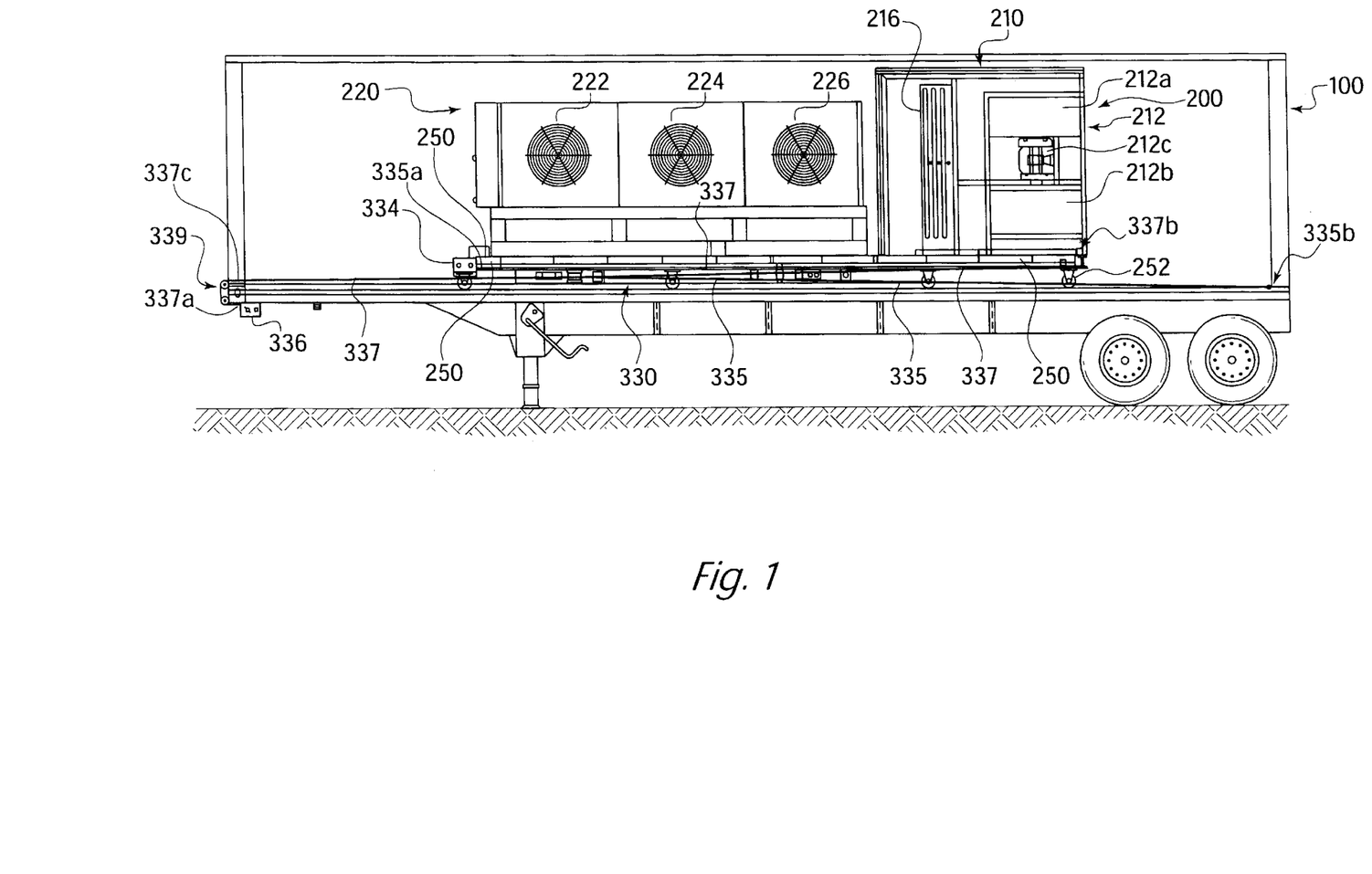
FIG. 1 is a side view of an embodiment for a cooling apparatus in accordance with the principles of the present invention with the cooler disposed within the container.

FIG. 1 illustrates a first embodiment for a cooling apparatus 10 in accordance with the principles of the present invention. As can be seen in FIG. 1, cooling apparatus 10 includes a container 100 and a cooler 200. Container 100 may be any of a wide variety of known trailer-type containers that are generally used to store produce. As can be further seen in FIG. 1, cooler 200 is able to be positioned within container 100 such that both container 100 and cooler 200 may be transported as a single unit to a particular location where a requirement exists for cooling, for example, produce. As such, the cooling apparatus of the present invention can be utilized, for example, to rapidly pre-cool produce in the field. After pre-cooling in the field with the present invention, the cooled produce can be transferred to a more permanent cooling facility. The present invention has particular utility for small to medium-sized farmers because of its efficiencies. Whereas the present invention has been described above for use in a particular cooling application, the present invention is not limited to the described scenario and can be utilized in a variety of different applications and environments where cooling of produce is required.

As will be further explained later in this specification, cooler 200 is telescopically movable between a first position, where it is disposed within container 100 to provide for, for example, transport of cooler 200, and a second position where cooler 200 is at least partially retracted from the interior volume of container 100. As will also be further described later in this specification, when cooler 200 has been retracted from container 100, cooler 200 is utilized to cool the interior volume of container 100 within which it had been previously disposed. Thus, the present invention provides a single unit cooling apparatus 10 that includes a container 100 and a cooler 200 where the cooler 200 may be both disposed within container 100 for purposes such as transportation and be retracted from container 100 such that, for example, produce may be stored and cooled within container 100. The produce is able to be stored and cooled in the same interior volume that is used to store the cooler, after the cooler is partially retracted from the container. As such, cooling apparatus 10 includes an interior volume that is utilized to both transport a cooler and to store and cool produce within it.

Figure 2:
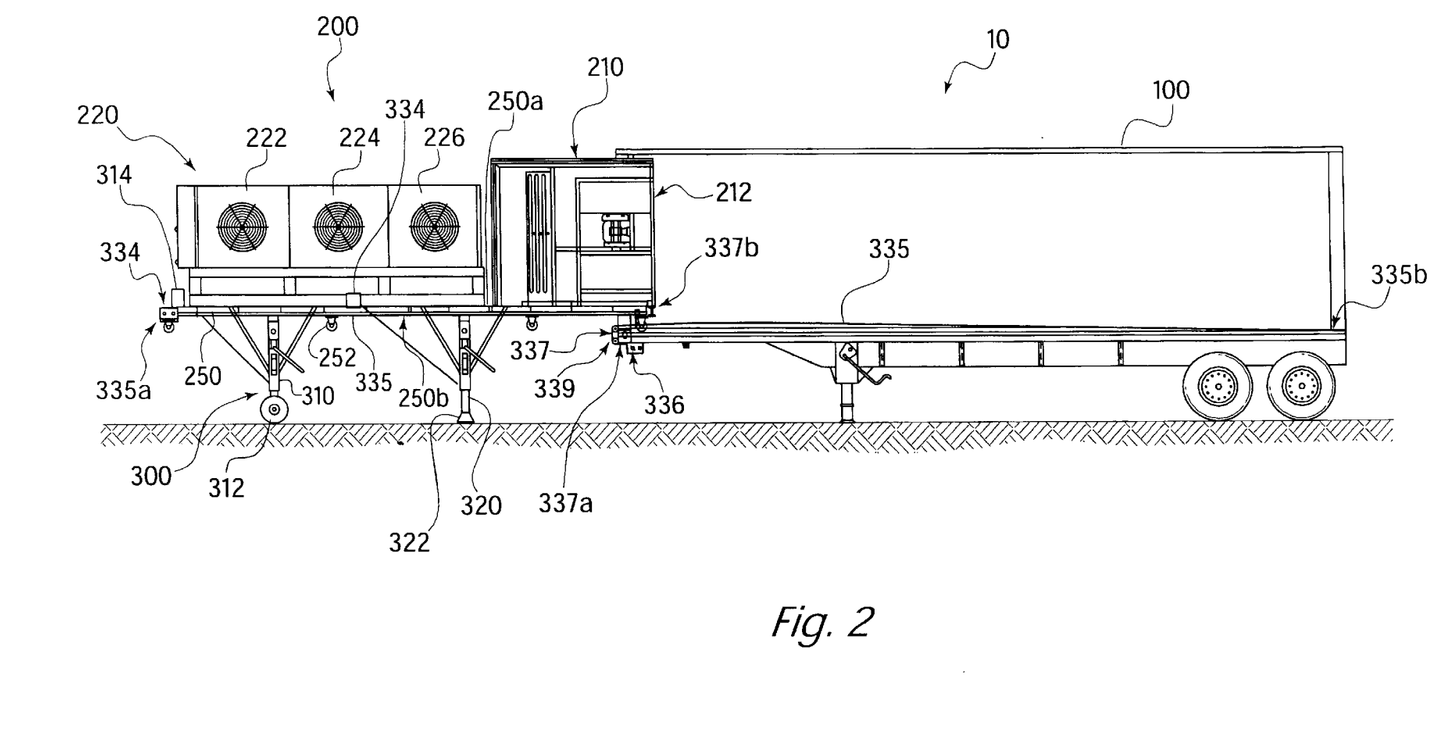
FIG. 2 is a side view of the cooling apparatus of FIG. 1 with the cooler retracted from the container.

FIG. 1 illustrates cooling apparatus 10 with cooler 200 in its first position where it is disposed within container 100. As will be discussed later in this specification, FIG. 2 illustrates cooler 200 in its second position where it is at least partially retracted from container 100.

Figure 4:
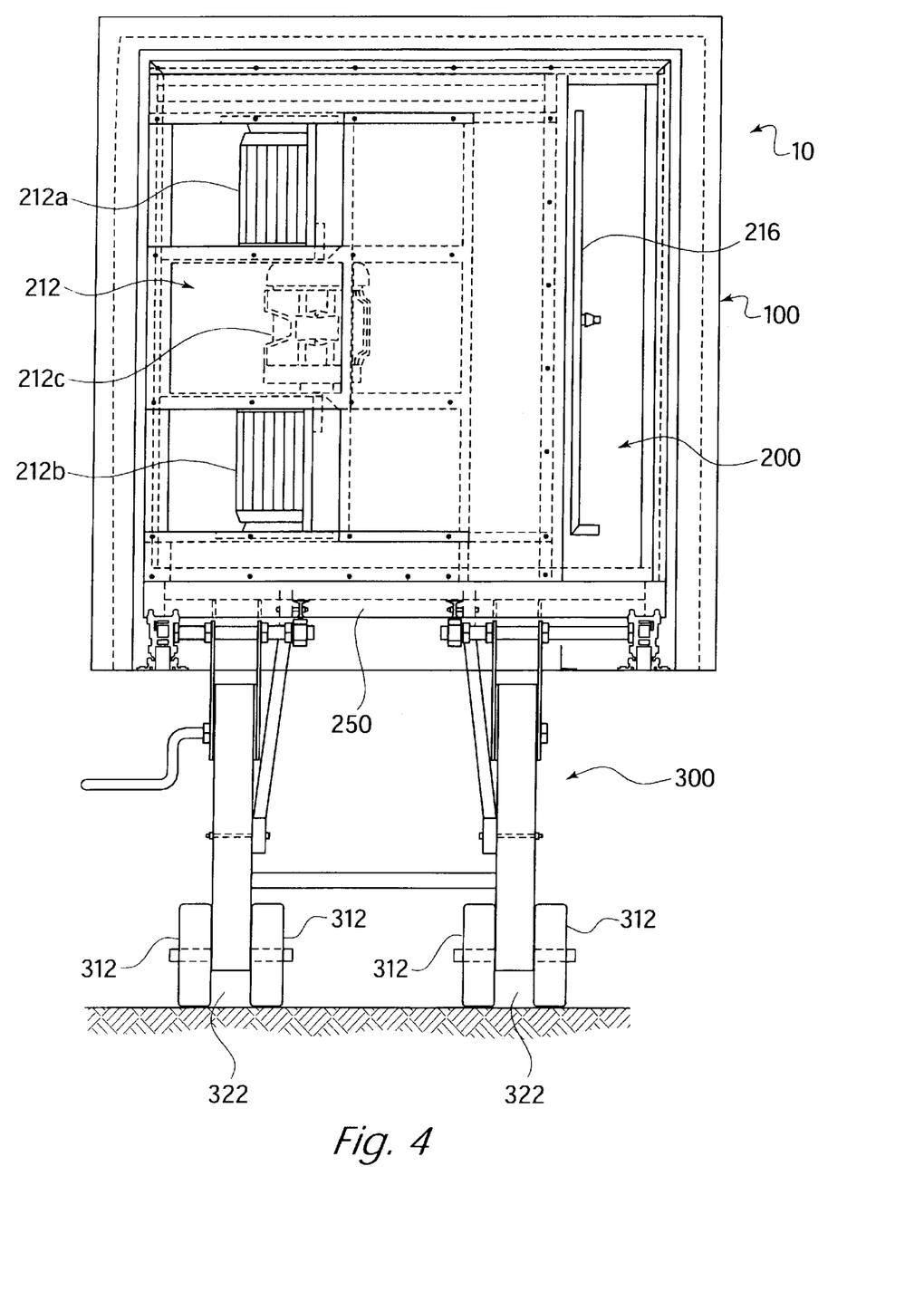
FIG. 4 is a front view of the cooler as disposed within the container.
Figure 5:
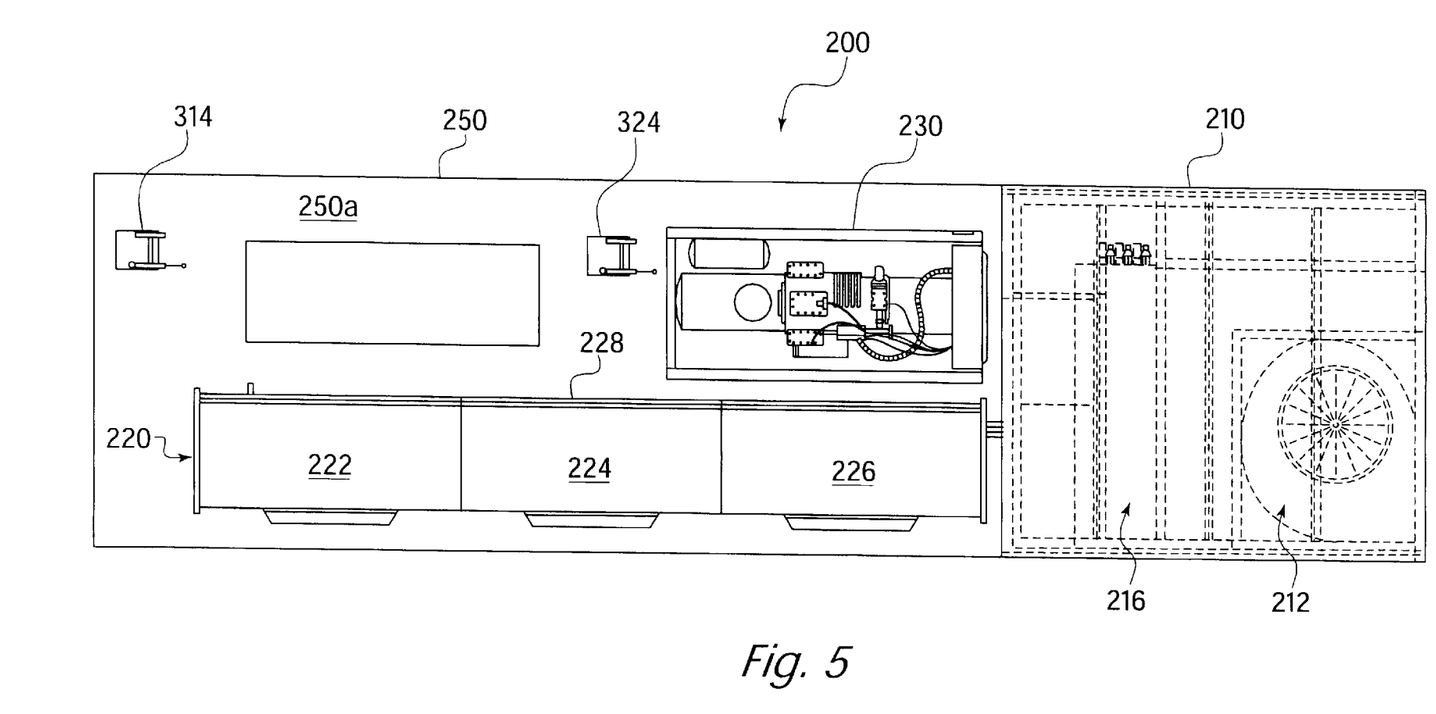
FIG. 5 is a top view of the cooler.

In further describing cooler 200, as can be seen in FIGS. 1 and 5, the cooler includes a refrigeration unit 210, a heat transfer fan assembly 220, a compressor 230, and, optionally, a generator 240. Refrigeration unit 210 of cooler 200 includes a fan assembly 212 and evaporator coils 216. As can best be seen in FIG. 4, fan assembly 212 includes a first blower 212A, a second blower 212B, and a common motor 212C which powers both the first blower 212A and the second blower 212B. As can be seen in FIG. 4, first blower 212A is disposed above motor 212C and second blower 212B is disposed below motor 212C. Evaporator coils 216 contain refrigerant within them that is utilized to transfer heat from air that passes over the evaporator coils, as is well-known in the art. As will be further explained later, the cooled air is supplied by fan assembly 212 to the interior volume of container 100 to cool produce that is stored within the container.

Compressor 230 is utilized in accordance with well-known principles to compress the refrigerant during portions of its refrigeration cycle within refrigeration unit 210. Likewise, heat transfer fan assembly 220, which includes fans 222, 224, and 226, are utilized in accordance with well-known principles in order to transfer heat from the refrigerant after the refrigerant is utilized to cool the air which passes across the evaporator coils. The refrigerant is cycled through the heat transfer fan assembly 220 through piping. Generator 240 is also utilized in accordance with well-known principles to provide electrical power to the refrigeration unit 210, the heat transfer fan assembly 220, and the compressor 230. Whereas an embodiment of the present invention includes a generator, the present invention is not limited to requiring its own generator. For example, the present invention is able to utilize an external power supply, such as a local supply provided at the site of the invention's utilization. The present invention can include a connector (not shown) that is able to connect to a power supply in order to meet its power requirements. Additionally, even if the present invention includes its own power supply, it can still be powered from an external source, if required.

In further describing cooler 200 when it is in its first position where it is disposed within container 100, as can also be seen in FIG. 1, when cooler 200 is disposed within container 100, cooler 200 is slidably disposed on the floor of container 100 through the use of wheels 252. As such, cooler 200 may be easily moved into container 100 and retracted from container 100.

In order to assist in moving cooler 200, an actuator 330 may be utilized. As can be seen in FIGS. 1 and 2, an embodiment for actuator 330 includes a first mover 334 and a second mover 336 (actuator 330 not shown in FIG. 3). First mover 334 is attached to a skid 250, upon which cooler 200 may be positioned and which will be further explained later in this specification. Second mover 336 is attached to the underside of container 100. A first cable 335 is attached to the first mover 334 at a first end 335A and to a floor of the container at a second end 335B. A second cable 337 is attached to the second mover 336 at a first end 337A and to the skid 250 at a second end 337B. Second cable 337 is disposed around a pulley assembly 339 at a location 337C which is proximate to the first end 337A of the second cable 337.

As can be understood, by reducing the effective lengths of the first and second cables by pulling on the cables with the respective movers, the first mover 334 is utilized to return skid 250, and thus cooler 200, back within container 100 and second mover 336 is utilized to retract skid 250 from container 100. The first and second movers 334, 336, respectively, can be, for example, either electrically or manually driven winches and may be remotely controlled.

An alternative embodiment for moving skid 250 is contemplated. A motor could be positioned at the end of container 100 where cooler 200 exits the container. A telescopically extendable and retractable rigid member could be attached to the motor at a first end and attached to either skid 250 or cooler 200 at a second end. Because the telescopic member is a rigid structure, it could be telescopically retracted to retract cooler 200 from container 100 and could be telescopically extended to return cooler 200 within container 100.

Figure 3:
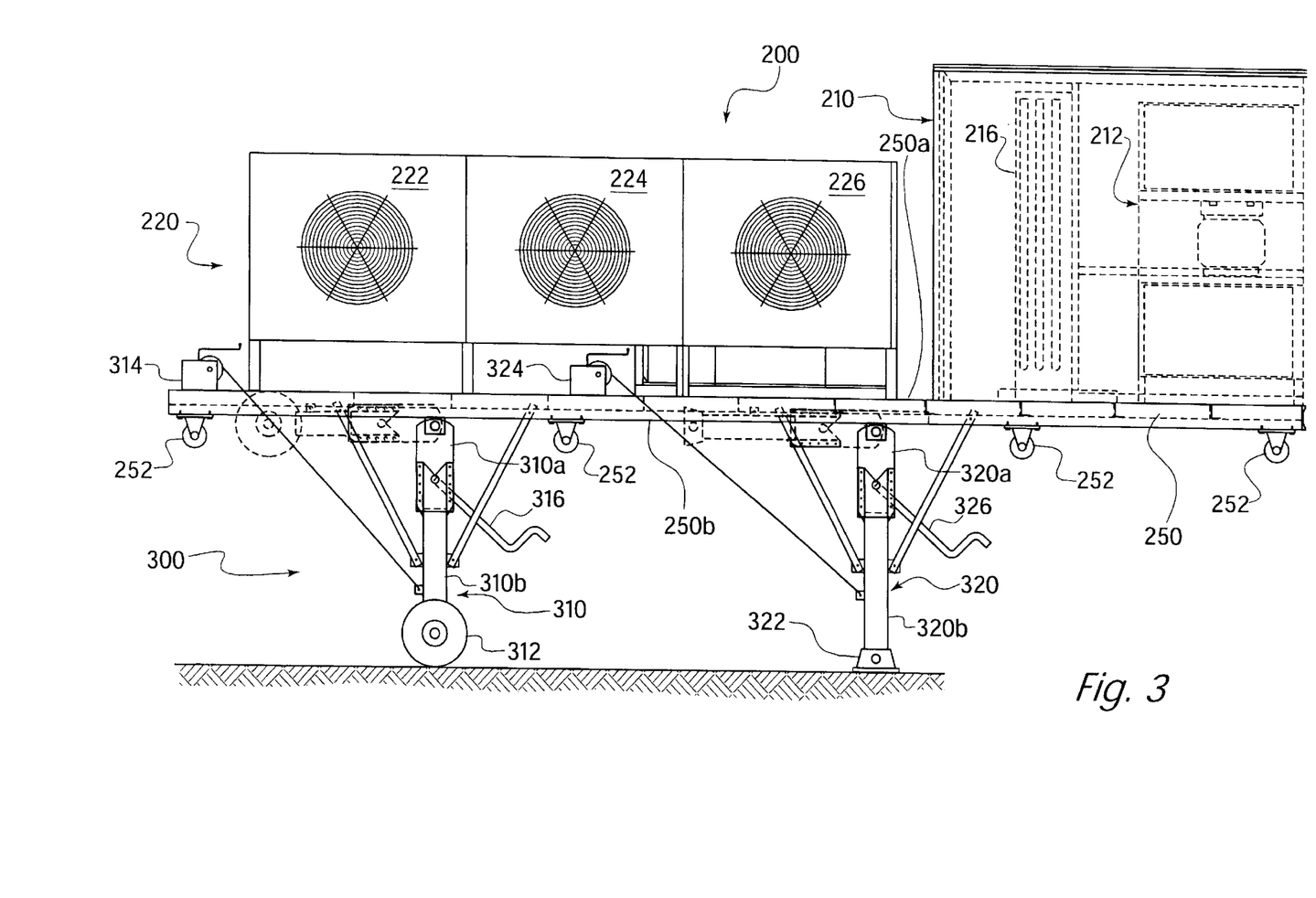
FIG. 3 is an enlarged side view of the cooler in its retracted position.

As can be further seen in FIGS. 2 and 3, and as mentioned above, cooler 200 is disposed on an upper surface 250A of a skid 250. Wheels 252 are disposed on an underside 250B of skid 250. Also disposed on the underside of skid 250B is a retractable support structure 300. Retractable support structure 300 includes a first pivotally-mounted support 310 and a second pivotally-mounted support 320. First support 310 is pivotally-mounted to skid 250 at its upper-most end and includes a wheel 312 at its lower-most end which engages with a ground surface. Second support 320 is also pivotally-mounted to skid 250 at its upper-most end and includes a base 322 at its lower-most end which also engages with the ground surface. Both first support 310 and second support 320 are retractable such that they are able to be moved from a first position where the support structure 300 is disposed substantially parallel to skid 250 (shown in phantom in FIG. 3) and a second position where the support structure 300 is disposed substantially perpendicular to skid 250. When retractable support structure 300 is disposed in its second position where the support structure is disposed substantially perpendicular to skid 250, the first support 310 and the second support 320 support the weight of skid 250, and thus cooler 200, when cooler 200 has been retracted from container 100. When retractable support structure 300 is moved to its first position where the support structure 300 is disposed substantially parallel to skid 250, the support structure 300 no longer supports the weight of skid 250 and does not impede the movement of skid 250 and cooler 200 along the floor of container 100 when cooler 200 is being returned to its first position within container 100.

In further describing retractable support structure 300, with reference to FIGS. 2 and 3, a winch 314 is utilized to pivot first support 310 between its first position and its second position. Additionally, first support 310 is comprised of a first upper end 310A and a lower end 310B that are movable with respect to each other such that the overall length of support 310 may be adjusted. A length adjustment hand crank 316 is included in first support 310 in order to adjust the relative position of upper end 310A with respect to lower end 310B such that the height of skid 250 above the ground surface may be adjusted. Both winch 314 and length adjustment hand crank 316 may be either electrically or manually operated and the present invention is not limited to any particular method of operation for these components.

Similarly, second support 320 is movable between its first position and its second position by winch 324, which may also be either electrically or manually operated. Also, second support 320 is comprised of an upper end 320A and a lower end 320B and includes a length adjustment hand crank 326 to adjust the length of second support 320.

As discussed above, first support 310 and second support 320 are movable between a substantially parallel orientation and a substantially perpendicular orientation with respect to skid 250. As such, it is not required that the first and second supports 310, 320, respectively, are exactly parallel and perpendicular to skid 250. Rather, the descriptions of substantially parallel and substantially perpendicular are utilized to describe the supports' orientations such that when the supports are parallel to skid 250 they do not impede rolling motion of skid 250 and when the supports are perpendicular to skid 250 they are able to adequately support the weight of skid 250, and consequently, cooler 200.

As discussed previously, FIG. 5 is a top view of cooler 200 which shows the arrangement of the various components of cooler 200 on skid 250. As described previously, transfer piping 228 is utilized to transport the refrigerant through fans 222, 224, and 226, in order to transfer heat from the refrigerant. Whereas FIG. 5 illustrates an embodiment for the arrangement of the components of cooler 200, the present invention is not limited to this particular arrangement and alternative arrangements are contemplated. For example, generator 240 can either be co-located with the other components on skid 250 or can be located on an adjoining structure. In an embodiment where generator 240 was included on an adjoining structure, the generator would be portable and would not necessarily be required to be transported with the other components of cooler 200.

Figure 6:
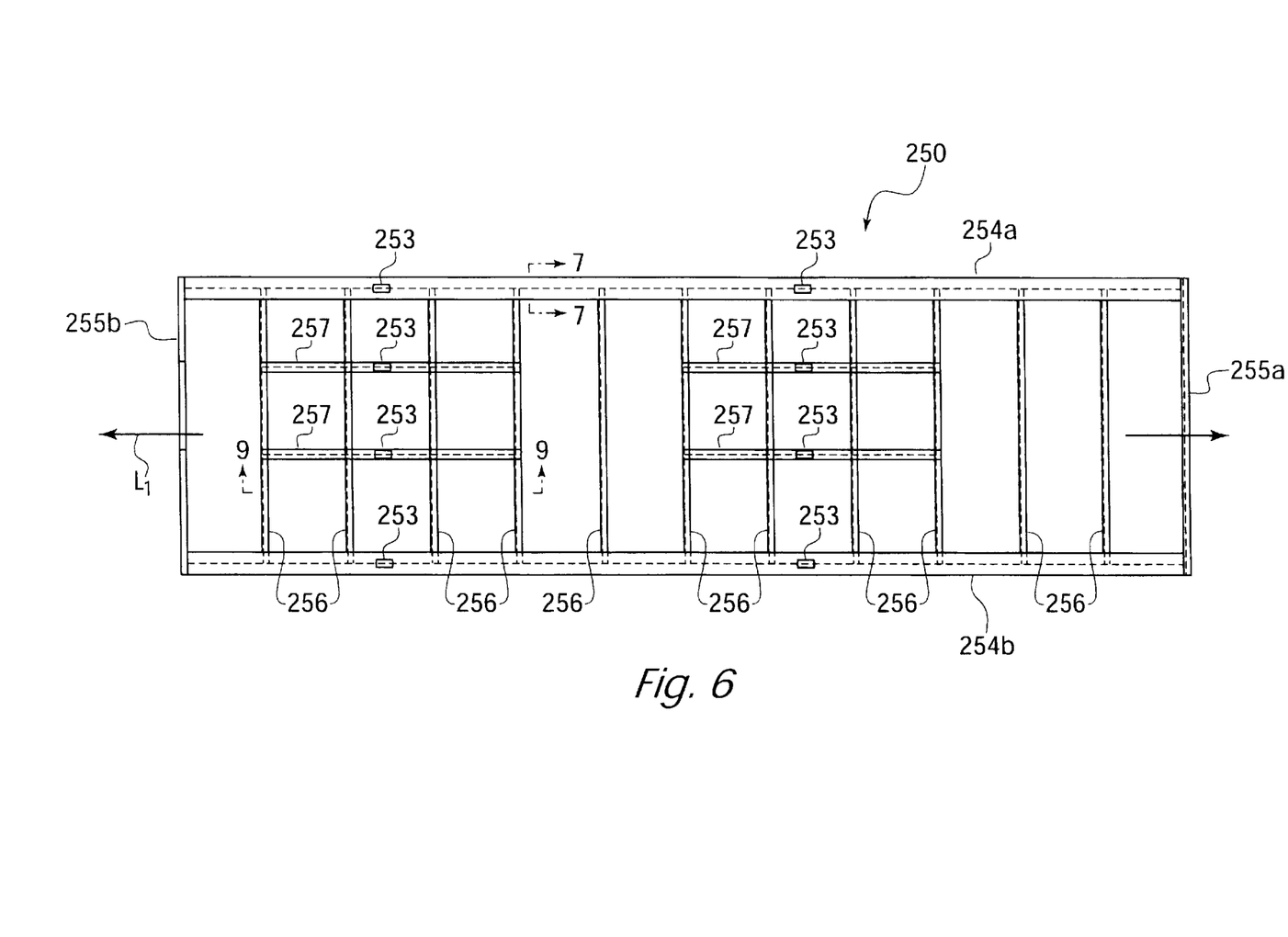
FIG. 6 is a top view of an embodiment of a skid in accordance with the principles of the present invention.

FIG. 6 illustrates an embodiment for the physical structure of skid 250. Whereas a particular embodiment is illustrated in FIG. 6, the present invention is not limited to any particular physical embodiment for skid 250. All that is required is that skid 250 be able to support a cooler that is utilized to cool produce within a container, as described previously. As can be seen in FIG. 6, skid 250 is generally configured as a rectangular structure that has a longitudinal axis $L_1$. Skid 250 includes a first I-beam 254A on a first side of skid 250 and a second I-beam 254B on a second side of skid 250. A first channel 255A is disposed at a first end of I-beams 254A and 254B and a second channel 255B is disposed at a second end of I-beams 254A and 254B. Supports 256 interconnect I-beam 254A with I-beam 254B along their interior length. Supports 256 extend perpendicular to the longitudinal axis $L_1$ of skid 250. Supports 257, which extend parallel to longitudinal axis $L_1$, are utilized to interconnect a plurality of supports 256. Included on the underside of skid 250 are a plurality of support structure mounts 253 which are utilized to secure the retractable support structure 300 to the underside 250B of skid 250.

Figure 7:
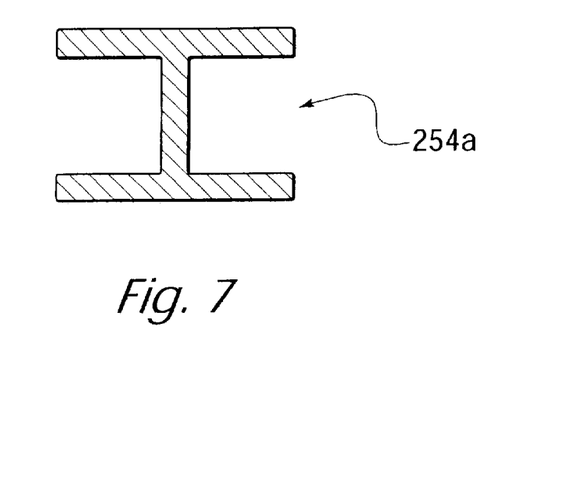
FIG. 7 is a cross-sectional view of an I-beam of the skid as taken along line 7—7 of FIG. 6.
Figure 8:
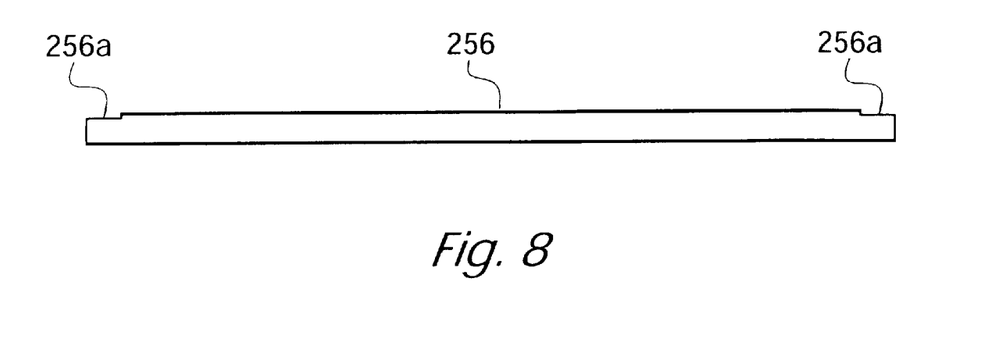
FIG. 8 is a side view of a support of the skid.

FIGS. 7 and 8 further illustrate the structure of I-beam 254A and support 256, respectively. As can be seen in FIG. 8, support 256 includes a notch 256A at each end thereof which is utilized to position support 256 on I-beams 254A and 254B. A portion of each eye beam is positioned within one of the notches.

Figure 9:
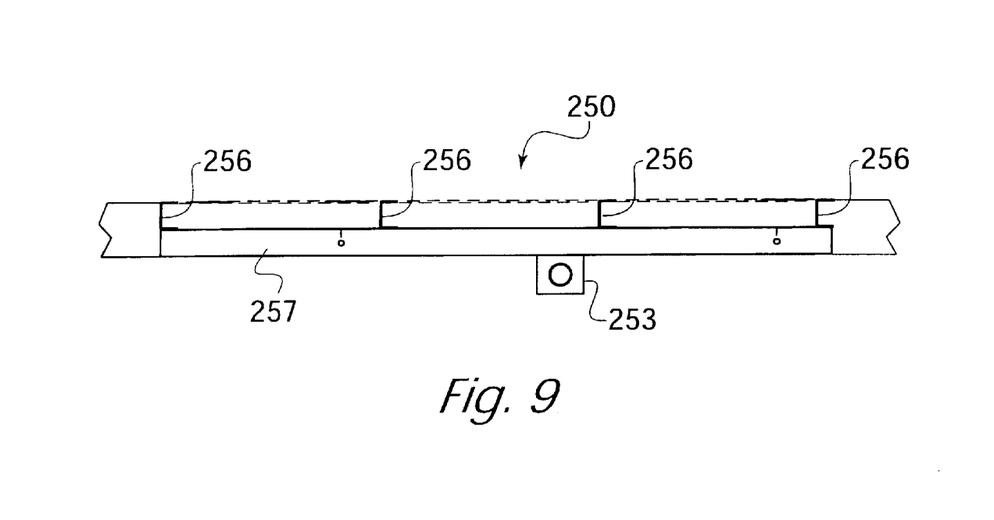
FIG. 9 is a cross-sectional view of a portion of the skid as taken along line 9—9 of FIG. 6.

FIG. 9 further illustrates the interconnection of longitudinally-extending support 257 and perpendicularly-extending supports 256. As can be seen, support structure mount 253 extends from the underside of skid 250.

Figure 10:
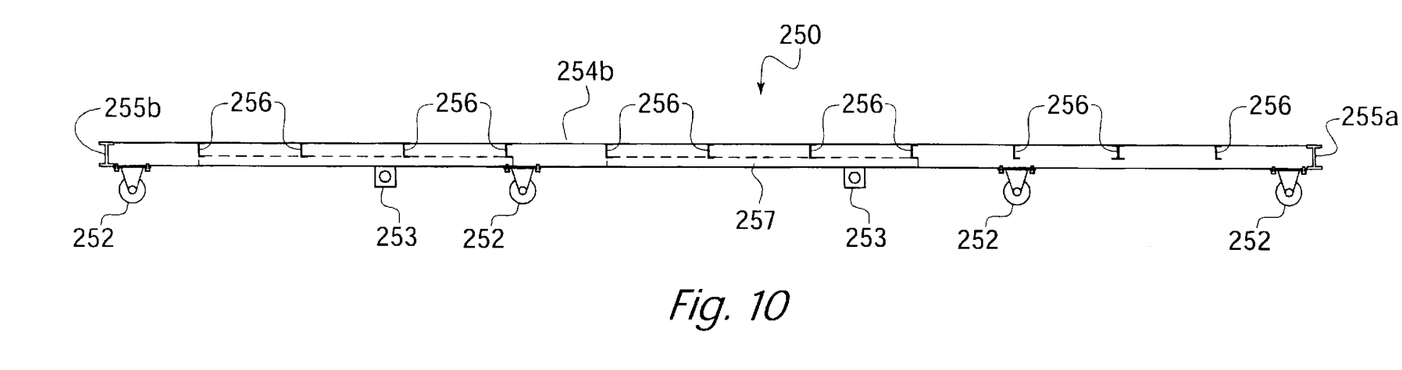
FIG. 10 is a side view of the skid of FIG. 6 with wheels attached to an underside thereof.
Figure 11:
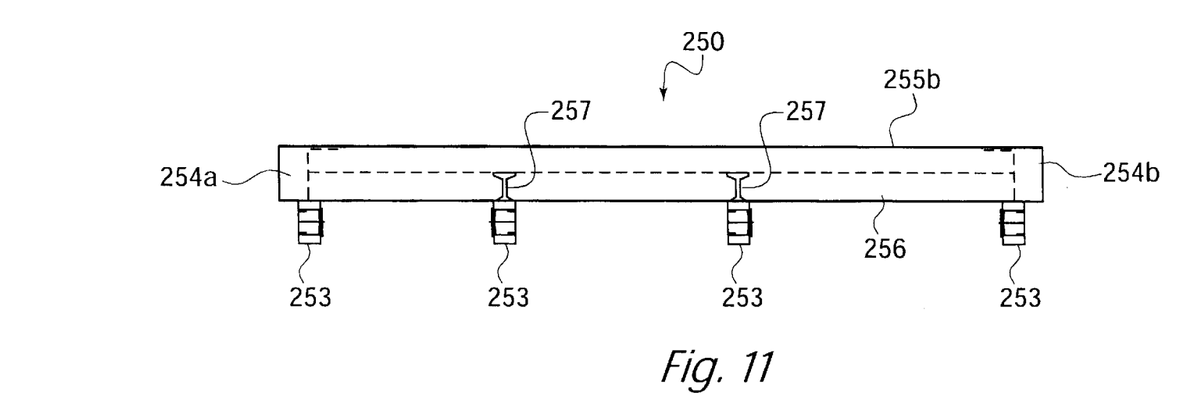
FIG. 11 is a rear view of the skid of FIG. 6.

FIGS. 10 and 11 further illustrate the structure of skid 250. As can be seen in FIG. 10, wheels 252, as discussed previously, extend from the underside of skid 250. FIG. 11 is a rear view of skid 250 further illustrating the interconnection of the various supports which comprise skid 250.

Figure 12:
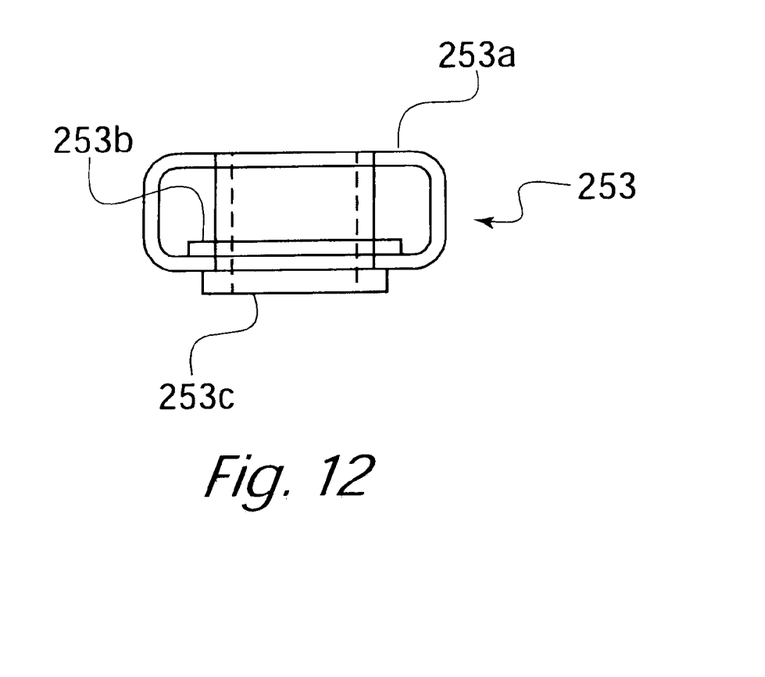
FIG. 12 is an end view of a support structure mount in accordance with the principles of the present invention.
Figure 13:
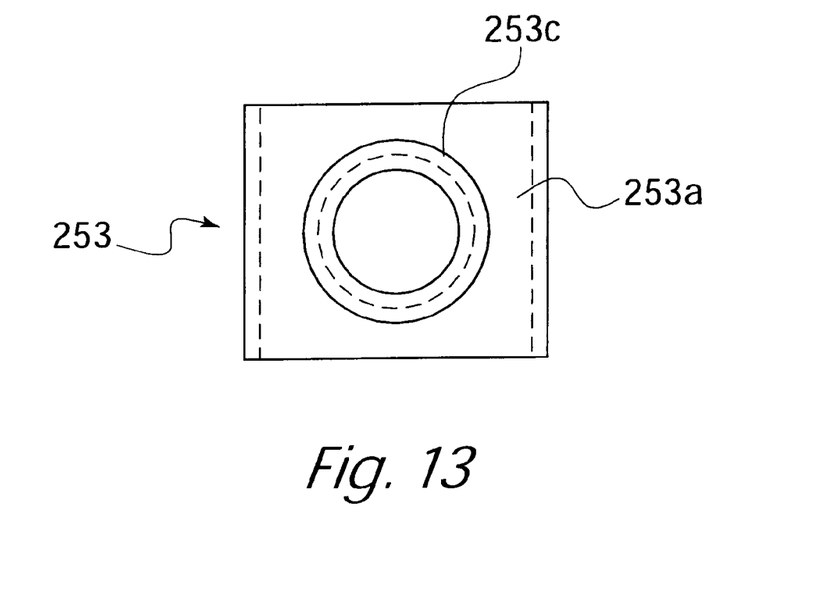
FIG. 13 is a side view of the support structure mount of FIG. 12.

FIGS. 12 and 13 further illustrate the support structure mounts 253. As can be seen, each mount 253 is formed of tubing 253A and a plate 253B. A bearing 253C, which may be bronze, is press-fit into tubing 253A.

Figure 14:
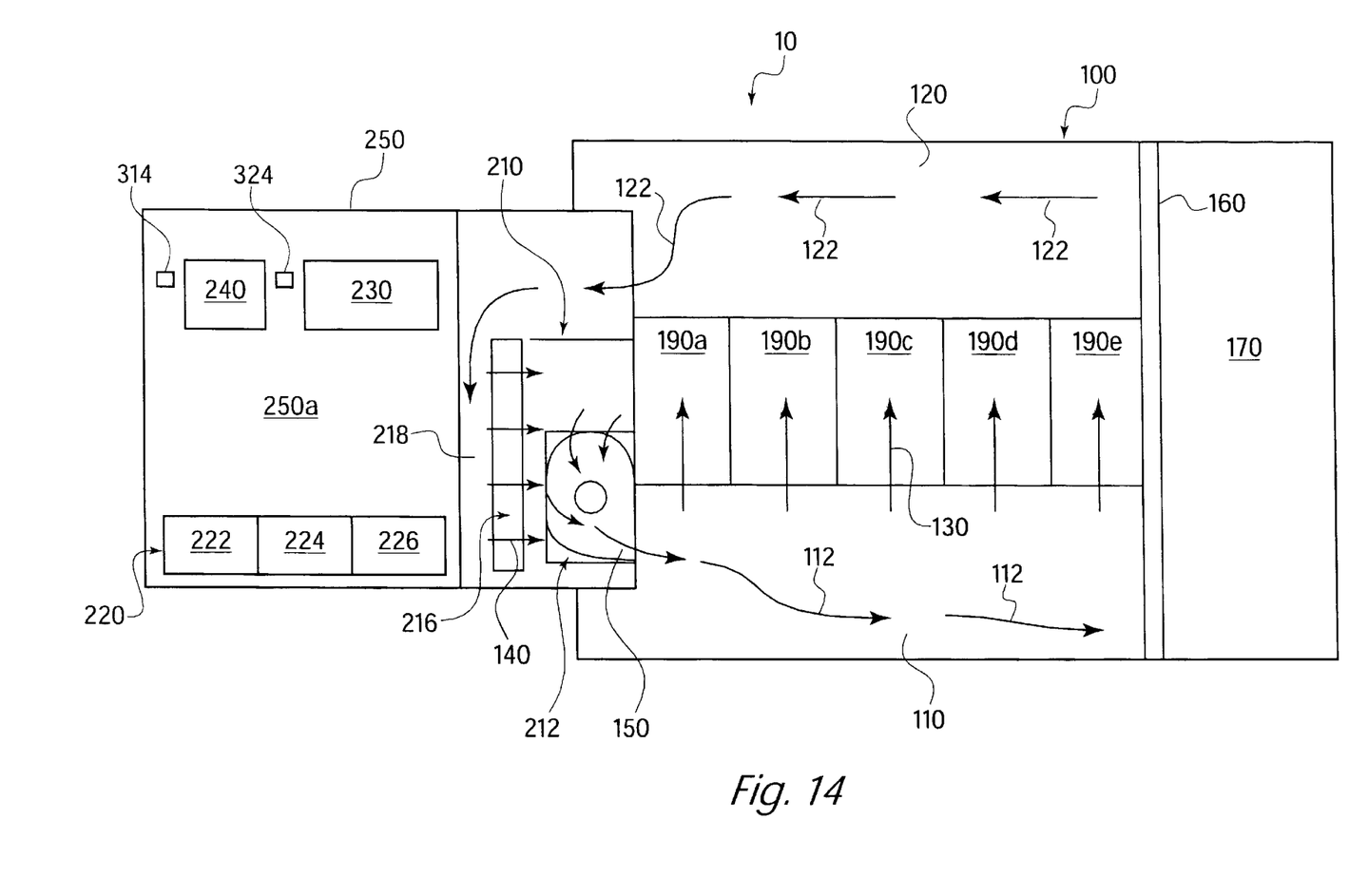
FIG. 14 is a top view of the cooling apparatus with the cooler is in its retracted position from the container.
Figure 15:
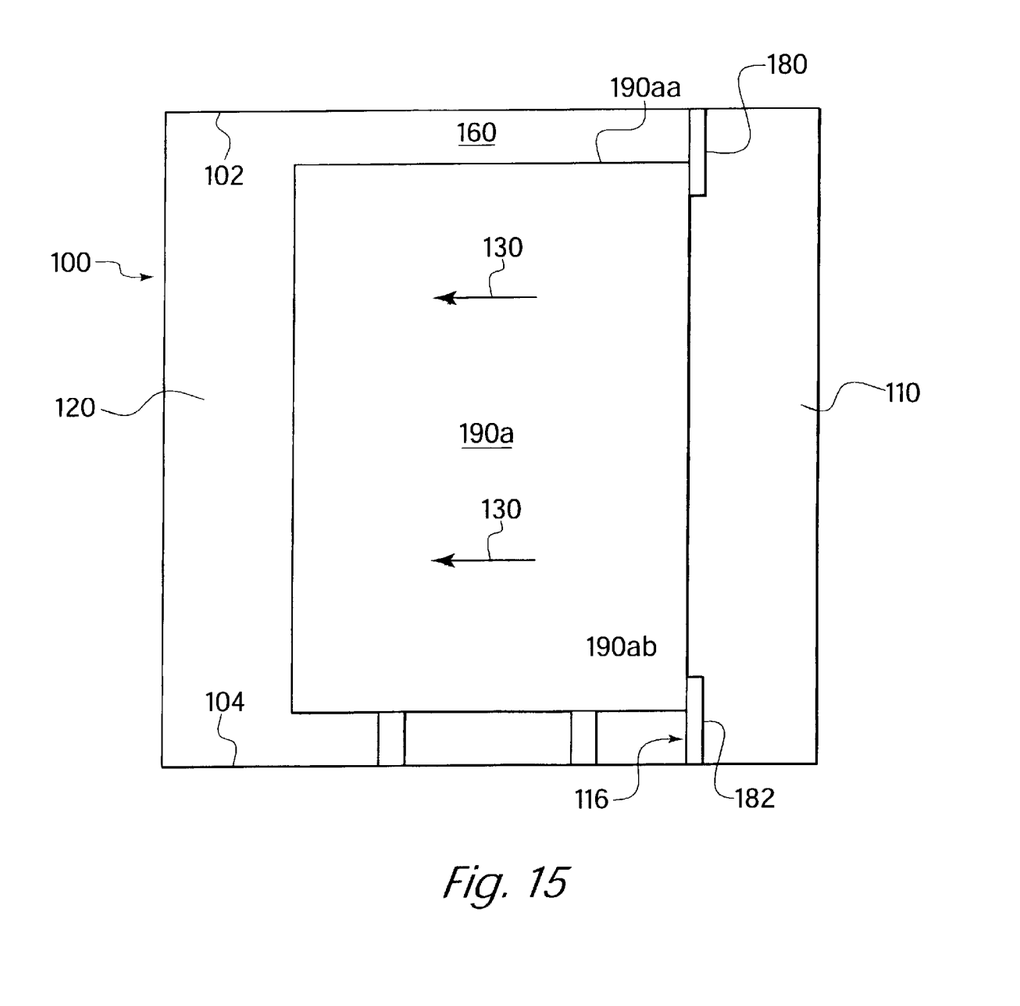
FIG. 15 is a rear view of the container with produce disposed therein.

In further describing the structure and operation of cooling apparatus 10, reference is made to FIGS. 2, 14 and 15. FIGS. 2 and 14 illustrate cooler 200 in its second position where the cooler is at least partially retracted from an interior volume of container 100. As cooler 200 begins its retraction from container 100, when first support 310 is clear of container 100, winch 314 is used to pivot support 310 to its perpendicular position such that it is able to support skid 250. As skid 250, and thus cooler 200, is further retracted from container 100, support 310 rolls across the ground surface on wheel 312 until second support 320 clears container 100. When skid 250 is positioned in its final position, which may be where only a portion of refrigeration unit 210 remains within container 100, second support 320 is pivoted to its perpendicular position such that skid 250 is supported by the first and second supports. A seal is provided to seal any gap existing between refrigeration unit 210 and container 100.

After cooler 200 has been retracted, as can be seen in FIG. 14, produce is stored within container 100 in a single row. FIG. 14 illustrates the invention as being used in an embodiment where produce is organized in palletized loads 190A–E. Each palletized load may include a plurality of protective boxes to unitize and protect the produce. The protective boxes are block-stacked on pallets for easy handling during their loading into and removal from container 100. As would be known by one skilled in the art, each of the protective boxes preferably includes side openings to facilitate airflow through the boxes. If a standardized trailer is utilized for container 100 which is known for storing produce within it, the single row of produce should have a width of 48 inches or less. With this width dimension for the produce, a high pressure (HP) plenum 110 may be defined on one side of the produce and a low pressure (LP) plenum 120 may be defined on an opposite side of the produce. As can be seen in FIGS. 14 and 15, HP plenum 110 is defined on its sides by a wall of container 100 on a first side and the produce on a second side and on its top and bottom by the ceiling 102 of container 100 and the floor 104 of container 100, respectively. Likewise, low pressure plenum 120 is also defined on its sides by a wall of container 100 and the produce and on its top and bottom by ceiling 102 and floor 104.

Because the present invention may be utilized in a container that is only partially filled with produce, a movable baffle 160 may be positioned within container 100 such that it extends perpendicular to the longitudinal axis of container 100 and lies adjacent to the rear end of the rear-most positioned produce load, which in FIG. 14 is illustrated as load 190E. Thus, baffle 160 provides a boundary between the used portion of container 100, in which produce is stored, and the unused portion 170 of container 100. Movable baffle 160 may be positioned within a track in order to assist in its positioning within the container. The baffle may be moved longitudinally within the track in relation to the trailer to longitudinally position the baffle and be pivoted within the track to rotate the baffle to its transverse orientation. Pending U.S. patent application Ser. No. 08/886,878 filed on Jul. 2, 1997 and U.S. Pat. No. 5,789,007 issued on Aug. 4, 1998 to Bianco disclose configurations for a baffle that may be utilized in the present invention and thus the above-referenced patent application and issued patent are incorporated herein by reference.

The movable baffle also allows for partially loading the container and cooling of the loaded produce, followed by adding more produce to the container and cooling the additional produce. Thus, the container does not have to be fully loaded before the produce may be cooled and the container can be incrementally loaded for cooling of the additionally-loaded produce.

In further describing HP plenum 110, reference is made to FIG. 15. An adjustable slide rail also serves as a ceiling seal 180 to seal-off the area above the palletized produce. Thus, ceiling seal 180 extends from ceiling 102 of container 100 to a position below the top-most end of the produce, which in FIG. 15 is seen as the top-most end 190AA of palletized produce load 190A. Thus, ceiling seal 180 comprises one component 114 of the inner boundary of HP plenum 110. Similarly, at the lower end of HP plenum 110, a floor seal 182 is utilized as another component 116 of the inner boundary of the HP plenum. Floor seal 182 extends between the bottom-most end of the produce load (illustrated as end 190AB in FIG. 15) and the floor 104 of container 100. Both ceiling seal 180 and floor seal 182 may be adjustable in their length such that they may effectively provide a seal for the inner boundary of HP plenum 110 when utilized with produce loads of different heights.

In further describing the operation and structure of the present invention, fan assembly 212 draws air through ducting 218 from low pressure plenum 120. This results in a low pressure airflow 122 through plenum 120. Because fan assembly 212 is drawing air from plenum 120, a low pressure, as measured in relation to the pressure in high pressure plenum 110, which will be discussed below, is created within low pressure plenum 120. As fan assembly 212 draws air from low pressure plenum 120 through ducting 218, an air flow 140 is directed over the evaporator coils 216 within refrigeration unit 210. As the air is drawn across evaporator coils 216, the air is cooled. The cooled air 150 from evaporator coils 216 is blown into high pressure plenum 110 by fan assembly 212, which results in a high pressure airflow 112. Since air is forced into the relatively-enclosed HP plenum 110, the pressure of the air within HP plenum 110 is greater than the pressure of the air that is within LP plenum 120. Because of the pressure differential that exits between low pressure plenum 120 and high pressure plenum 110, an air flow 130 of cool air is drawn from high pressure plenum 110 through the palletized produce loads 190A–E and into low pressure plenum 120. The drawing of the cool air from high pressure plenum 110 through the produce and into low pressure plenum 120 cools the produce as the cooled air passes through it. Thus, by creating a pressure differential on opposing sides of the produce, a cool airflow is directed across the produce. U.S. patent application Ser. No. 08/886,878, mentioned above, also discloses the cooling of produce by creating airflow between a high pressure plenum and a low pressure plenum and, as stated above, its disclosure is incorporated herein by reference.

Several alternatives on the disclosed embodiment are contemplated. For example, whereas it was described that baffle 160 may extend along the entire width of container 100 at a position adjacent to the rear-most palletized produce load, it is not required that baffle 160 extend across the high pressure plenum and thus form the rear-most end of the high pressure plenum. For example, it is possible that the high pressure plenum have an atmospheric pressure that is at, or substantially near, the ambient atmospheric pressure that is present within the unused portion of the container or the environment external to container 100. Thus, it is not required that baffle 160 be utilized to enclose the rear-most end of the high pressure plenum. All that is required is that a pressure differential exist between the high pressure plenum and the low pressure plenum such that cool air can be drawn from the high pressure plenum across the produce and into the low pressure plenum. Thus, it is contemplated that the high pressure plenum could exist at, or near, ambient atmospheric pressure as long as the low pressure plenum has an atmospheric pressure below that of the high pressure plenum. Thus, baffle 160 could be utilized to provide a rear-most boundary for the low pressure plenum but yet not be required for providing a rear-most boundary for the high pressure plenum. As the fan assembly blows cool air into the high pressure plenum, the proximity of the cool air to the produce and to the low pressure plenum would allow the cool air, even at ambient atmospheric pressure, to be drawn across the produce into the low pressure plenum, thus providing for cooling of the produce.

In order to provide for the blowers of the fan assembly to efficiently both draw air from the low pressure plenum and blow air into the high pressure plenum, it may be desirable to use a backward inclined fan that would include a hub with rectangular plates at a slight angle, e.g., approximately 10 to 20 degrees.

Thus, as described above, the present invention provides a system for cooling produce in the field. The cooler is telescopically deployable from the container. When the cooler is retracted from the container, the interior volume of the container is available for storage and cooling of the produce. Thus, a separately transportable trailer bed, i.e., separately transportable from the container, is not required for providing a cooling apparatus to a farmer. Whereas the present invention has utility for any application where produce must be cooled, as mentioned previously, it has particular benefits for smaller to mid-sized farmers because of its efficiencies where a cooling apparatus can be provided which includes a container that can be utilized for both transportation of the cooler and storage of the produce for cooling. The apparatus can be used to rapidly pre-cool produce in the container where the produce may then be removed from the container and stored in more permanent storage and cooling facilities.

Whereas the disclosed embodiments describe the present invention as being utilized to telescopically position a cooler, the present invention is not limited to being utilized for only this particular application. For example, the present invention has utility for any application where it is desirable to both store equipment within an interior volume of a container and, after retracting the equipment from the container, utilize the container volume for another purpose. It can be contemplated that the present invention may be utilized, for example, for positioning construction equipment on the skid. When the skid is removed from the container the equipment could be operated from the skid and the container's interior volume could then be utilized, for example, as a field office for the personnel at the construction site. Other applications are also within the scope of the present invention.

The disclosed embodiments are illustrative of the various ways in which the present invention may be practiced. Other embodiments can be implemented by those skilled in the art without departing from the spirit and scope of the present invention.

What is claimed is:

1. A cooling apparatus for produce, comprising:

a container having an interior volume; and a cooler, said cooler movable between a first position where said cooler is disposed within said interior volume and a second position where said cooler is at least partially retracted from said interior volume and wherein said cooler is adapted to cool at least a portion of said interior volume when said cooler is in said second position.

2. The apparatus of claim 1 wherein said cooler is disposed on an upper side of a skid and further comprising a support structure disposed on an underside of said skid, said support structure movable between a first position where said support structure is disposed substantially parallel to said skid and a second position where said support structure is disposed substantially perpendicular to said skid.

3. The apparatus of claim 2 wherein said support structure includes:

a first support;

a second support;

a first winch disposed on said upper surface of said skid and operably coupled to said first support; and a second winch disposed on said upper surface of said skid and operably coupled to said second support.

4. The apparatus of claim 3 wherein said first support is adjustable in length and includes a length adjustment hand-crank and wherein said second support is adjustable in length and includes a length adjustment hand-crank.

5. The apparatus of claim 2 further comprising a plurality of wheels, said plurality of wheels disposed on said underside of said skid and engaging a floor of said container when said cooler is in said first position.

6. The apparatus of claim 1 wherein when said cooler is in said second position said interior volume of said container includes a high pressure plenum and a low pressure plenum and wherein cooled air is drawn from said high pressure plenum to said low pressure plenum.

7. The apparatus of claim 6 further comprising a baffle door, said baffle door disposed within said container adapted to be positioned at a rear-most end of the produce and defining a rear end of said low pressure plenum.

8. The apparatus of claim 7 wherein said baffle door also defines a rear end of said high pressure plenum.

9. The apparatus of claim 6 further comprising:

a first seal disposed at a ceiling of said container and adapted to be positioned at a top-most end of the produce and defining a first inner boundary of said high pressure plenum; and a second seal disposed at a floor of said container and adapted to be positioned at a bottom-most end of the produce and defining a second inner boundary of said high pressure plenum.

10. The apparatus of claim 9 wherein said first seal is adjustable in length.

11. The apparatus of claim 3 further comprising a wheel attached to said first support and a base connected to said second support.

12. The apparatus of claim 2 further comprising:

a first mover attached to said skid;

a second mover attached to an underside of said container;

a first cable attached to said first mover at a first end and to a floor of said container at a second end; and a second cable attached to said second mover at a first end and to said skid at a second end.

13. The apparatus of claim 12 wherein said first and second movers are remotely controlled electric winches.

14. The apparatus of claim 12 wherein second cable is disposed around a pulley assembly at a location proximate to said first end of said second cable.

15. The apparatus of claim 1 further comprising:

a mover attached to a floor of said container; and a telescopically extendable and retractable member attached to said mover at a first end and to said cooler at a second end.

16. An apparatus for cooling produce, comprising:

a cooler, said cooler including:

a refrigeration unit;

a heat transfer fan operably coupled to said refrigeration unit; and a compressor operably coupled to said refrigeration unit; and a skid slidably movable across a surface, said cooler disposed on an upper side of said skid and said skid including:

a support structure disposed on an underside of said skid, said support structure movable between a first position where said support structure is disposed substantially parallel to said skid and a second position where said support structure is disposed substantially perpendicular to said skid.

17. The apparatus of claim 16 further comprising a generator operably coupled to said cooler, said generator disposed on said upper side of said skid.

18. The apparatus of claim 16 wherein said support structure includes:

a first support;

a second support;

a first winch disposed on said upper surface of said skid and operably coupled to said first support; and a second winch disposed on said upper surface of said skid and operably coupled to said second support.

19. The apparatus of claim 18 wherein said first support is adjustable in length and includes a length adjustment hand crank and wherein said second support is adjustable in length and includes a length adjustment hand crank.

20. The apparatus of claim 16 further comprising a plurality of wheels, said plurality of wheels disposed on said underside of said skid.

21. The apparatus of claim 16 wherein said refrigeration unit includes:

a motor;

a first blower disposed above said motor and operably coupled to said motor; and a second blower disposed below said motor and operably coupled to said motor.

22. The apparatus of claim 21 wherein said first and second blowers include a hub that has a rectangular plate inclined at an angle of between 10–20°.

23. A method for cooling produce, comprising the steps of:

retracting a cooler at least partially from a container;

storing produce within said container; and cooling an interior volume of said container with said cooler.

24. The method of claim 23 wherein said step of retracting a cooler at least partially from the container includes the step of operating a winch.

25. The method of claim 23 wherein said step of retracting a cooler at least partially from the container includes the step of rolling a skid along a floor of said container, said cooler disposed on an upper surface of said skid.

26. The method of claim 23 wherein said step of retracting a cooler at least partially from the container includes the step of moving a support structure attached to an underside of a skid from a first position where said support structure is disposed substantially parallel to said skid to a second position where said support structure is disposed substantially perpendicular to said skid, said cooler disposed on an upper surface of said skid.

27. The method of claim 23 wherein said step of cooling an interior volume of said container with said cooler includes the step of drawing cooled air from a high pressure plenum to a low pressure plenum across the produce.

28. The method of claim 23 wherein said step of cooling an interior volume of said container with said cooler includes the steps of:

drawing air from a first plenum by a fan through a duct without passage through the produce;

cooling the air in the cooler; and blowing the cooled air into a second plenum by the fan, the second plenum having a greater atmospheric pressure than the first plenum.

29. The method of claim 28 wherein the atmospheric pressure of the second plenum is equivalent to an ambient atmospheric pressure.

30. The method of claim 23 further comprising the steps of:

storing said cooler within said interior volume prior to said step of retracting the cooler; and storing the produce within said interior volume after said step of retracting the cooler.

31. A telescoping equipment apparatus, comprising:

a container having a unitary interior volume for alternatively storing an item and an equipment;

said equipment disposed on an upper surface of an equipment skid, said equipment skid movable between a first position where said equipment skid and said equipment is disposed within said unitary interior volume such that said item is not able to be received within said unitary interior volume and a second position where said equipment skid and said equipment is at least partially retracted from said unitary interior volume such that said item is receivable within said unitary interior volume.

32. The apparatus of claim 31 further comprising a support structure disposed on an underside of said skid, said support structure movable between a first position where said support structure is disposed substantially parallel to said skid and a second position where said support structure is disposed substantially perpendicular to said skid.

33. The apparatus of claim 32 wherein said support structure includes:

a first support;

a second support;

a first winch disposed on said upper surface of said skid and operably coupled to said first support; and a second winch disposed on said upper surface of said skid and operably coupled to said second support.

34. The apparatus of claim 33 wherein said first support includes a wheel attached at a lower end of said first support and engageable with a ground surface and wherein said second support includes a base attached at a lower end of said second support and engageable with the ground surface.

35. A telescoping equipment apparatus, comprising:

a container having an interior volume;

an equipment skid, said equipment skid movable between a first position where said equipment skid is disposed within said interior volume and a second position where said equipment skid is at least partially retracted from said interior volume;

an equipment disposed on an upper surface of said equipment skid; and a support structure disposed on an underside of said equipment skid, said support structure movable between a first position where said support structure is disposed substantially parallel to said equipment skid and a second position where said support structure is disposed substantially perpendicular to said equipment skid.

36. The apparatus of claim 35 wherein said support structure includes:

a first support;

a second support;

a first winch disposed on said upper surface of said equipment skid and operably coupled to said first support; and a second winch disposed on said upper surface of said equipment skid and operably coupled to said second support.

37. The apparatus of claim 36 wherein said first support includes a wheel attached at a lower end of said first support and engageable with a ground surface and wherein said second support includes a base attached at a lower end of said second support and engageable with the ground surface.

* * * * *